United States Patent Office 3,564,920
Patented Feb. 23, 1971

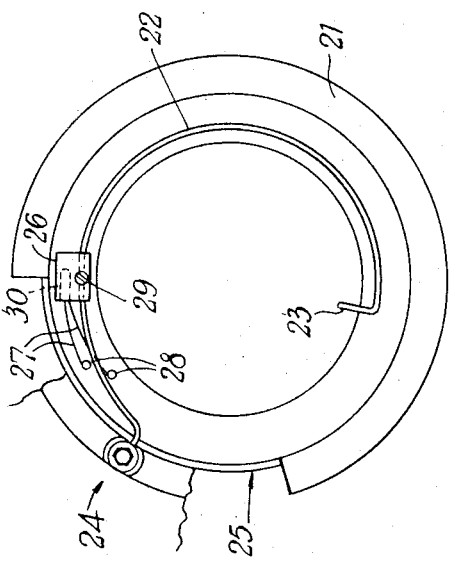
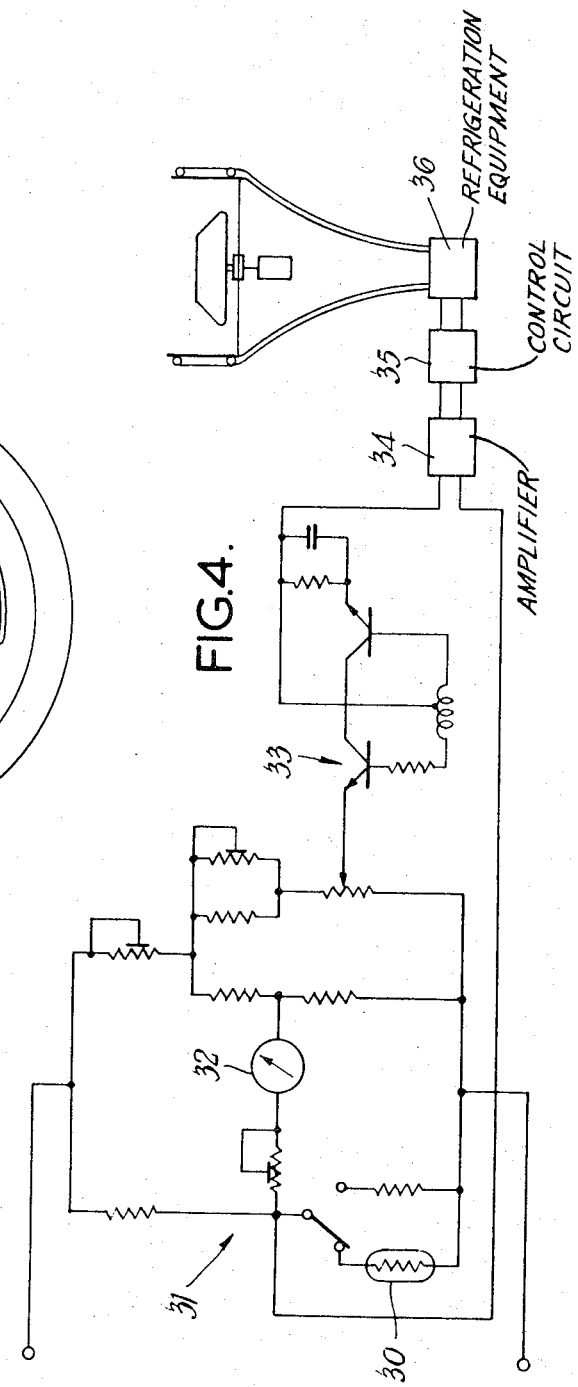

3,564,920
TEMPERATURE SENSING IN CENTRIFUGES
Norman Richard Harbott, Crawley, England, assignor to MSE Holdings Limited, Crawley, Sussex, England, a British company
Filed Sept. 23, 1968, Ser. No. 761,620
Claims priority, application Great Britain, Oct. 11, 1967, 46,477/67
Int. Cl. G01k 1/16, 1/14, 7/16
U.S. Cl. 73—351       7 Claims

ABSTRACT OF THE DISCLOSURE

A centrifuge which has a bowl within which a rotor is carried by a shaft. A wire which is a good conductor of heat is thermally connected between the bowl and the bearing of the shaft. A temperature sensitive element coupled to the wire measures the temperature of the wire between its ends. The position of the temperature sensitive element relative to the length of the wire is adjusted so that the temperature measured will be the same as the contents of the rotor.

---

This invention relates to temperature sensing in centrifuges.

In centrifuges, the problem arises of measuring the temperature of the contents of the rotor. Various proposals have been put forward but most involve the use of a temperature sensitive element within and rotating with the rotor, with the disadvantage that it is difficult to obtain a transfer of information from the moving sensing element to stationary indicating means. A stationary sensing element has been proposed which depends into a recess in the rotor from an arm, but this arm must be moved each time a rotor is replaced.

In accordance with the present invention there is provided in a centrifuge comprising a bowl which can be evacuated, a driving shaft extending into said bowl for supporting a rotor, a bearing rotatably supporting said shaft and a temperature sensitive element for obtaining a measure of the temperature of rotor contents: the improvement which comprises an elongate member of good thermal conductivity coupled in thermally conductive manner at one region of said member to said bowl, at another region to said bearing and at a region intermediate said one region and said another region to said temperature sensitive element.

The temperature sensitive element will thus be in thermally conductive connection with a portion of the member at a temperature which is intermediate, and a function of, the temperature of the bowl and the temperature of the bearing, whereby, it has been discovered, one can obtain from said element a measure of the rotor content temperature. In fact said member acts as an analogue simulation of the bowl-rotor-bearing system.

Figure 1:
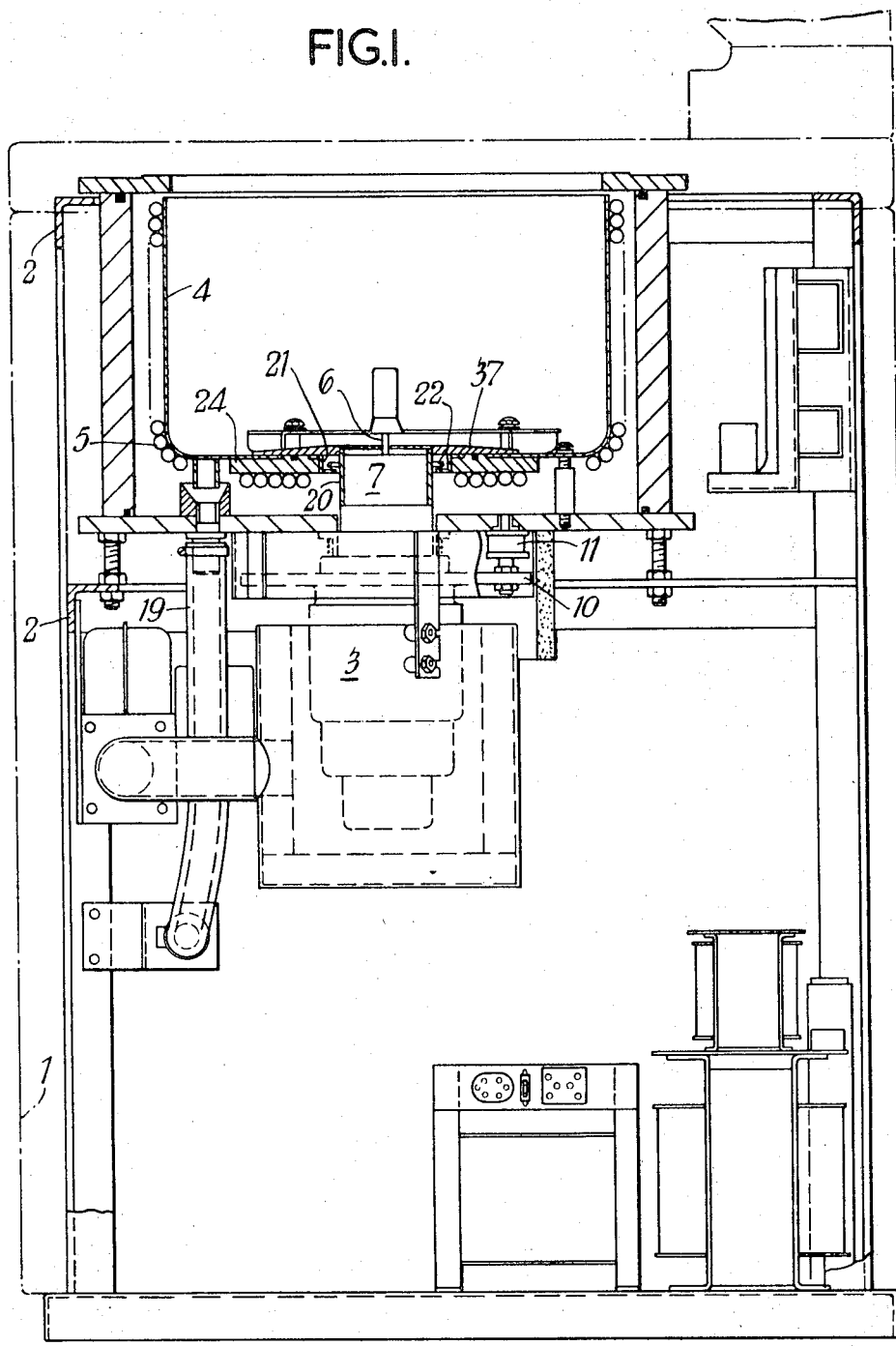
Figure 2:
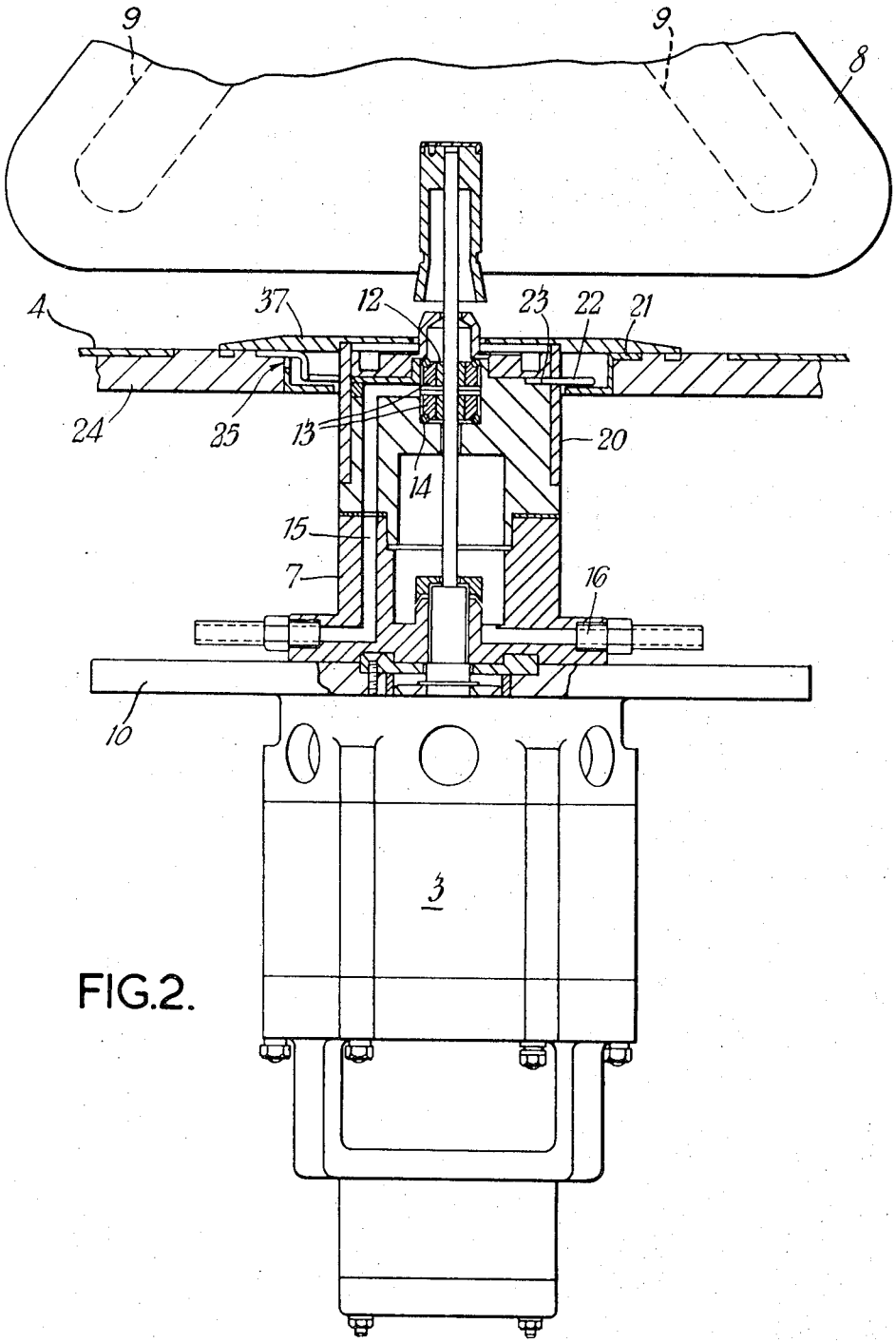

For a better understanding of the invention, and to show how the same may be carried into effect, reference will now be made, by way of example, to the accompanying drawings, in which:

FIG. 1 is a cross-sectional view of a centrifuge;
FIG. 2 is a cross-section of a portion of the centrifuge of FIG. 1;
FIG. 3 is a plan view of the probe ring of the centrifuge; and
FIG. 4 is a circuit diagram for the centrifuge of FIG. 1.

FIG. 1 shows a centrifuge having a casing 1 containing a framework generally denoted 2 supporting an electric driving motor 3, a bowl 4 and other pieces of equipment which are not shown, such equipment including heating and refrigerating equipment connected to a heat-exchange coil 5 surrounding the bowl and controlling the bowl temperature through the range from −20 to +40° centigrade.

The motor 3 is coupled to drive a shaft 6 at, say, 25,000 r.p.m., the shaft being supported in a bearing having a housing 7. The shaft is adapted to support a replaceable rotor 8 (FIG. 2) containing angled pockets 9 for test tubes of material to be centrifuged. The motor 3 is carried by a plate 10 supported resiliently by spring 11 (only one of which is visible in FIG. 1) on a sealed housing surrounding the bowl and supported on the framework 2.

FIG. 2 shows more clearly the motor 3, upon its mounting plate 10, and the bearing housing 7 and associated parts. The bearings are of white metal 12 backed by bronze shells 13. The shells 13 are supported in the housing 7 by O-rings 14 whereby the shaft can move relatively to the housing to adopt its own axis of revolution during high speed operation. This axis does not necessarily coincide with its axis in the illustrated stationary state. The lateral movement permitted avoids the strain on the shaft which would occur if the shaft were constrained to rotate at all times about a predetermined axis. Passages 15 and 16 are provided for cooling oil for the bearings and a passage (not visible) is provided through the housing for evacuating the bowl 4 in conjunction with an outlet 19 (FIG. 1).

The housing 7 is surrounded by a tufnol oil shroud 20 itself surrounded by a polypropylene ring 21 (FIGS. 1 and 2) defining with the shroud an annular channel.

A temperature sensing arrangement is provided for sensing the temperature of the contents of the pockets in the rotor 8. This arrangement comprises a wire 22 of good thermal conductivity, for example copper, inserted at one end 23 into the bearing housing 7 close to the bearings and connected at its other end to the bowl 4 in thermally conductive manner through a base plate 24 of the bowl. The wire, for example of 80 thousandths of an inch in diameter, extends along an arcuate path (as shown in FIG. 3), through the channel defined by the ring 21 to an aperture 25 in the ring where it emerges from the channel and extends into the annular groove provided in the plate 24 for the flange of ring 21. The wire is clamped in a counter bore in this groove by a hexagonal screw and washer (FIG. 3). The wire 22 extends about the axis for about 270°, although in FIG. 2 it is shown as extending only for about 180° in order to show both ends of the wire in this figure. The channel defined by the ring 21 may be substantially closed at its upper side to protect the wire 22 from direct radiation from the rotor by a member 37.

The wire 22 extends through a brass slider 26 in which is embedded a temperature sensitive element 30, in this case a platinum wire, the resistance of which is related to its temperature. The element 30 has leads 27 extending to terminals 28 on the ring 21. The slider 26 is secured to the ring 21 by a screw (not shown) and the wire 22 can be secured to the slider by a screw 29.

The temperature sensitive element 30 is connected to an electric circuit whereby indication can be obtained of the value of the resistance of the element and thus of the temperature of the region of the wire 22 upon which the slider 26 is mounted.

It is to be noted that the temperature of the rotor depends upon the heat given to it or drawn from it by the bowl and the heat given to it by the bearings. This system of heat transfer is simulated in steady state conditions by the wire 22 connected both to the bowl and to the bearing. Accordingly, the resistance of the temperature sensitive element varies with the temperature of the contents of the pockets of the rotor and can thus be used as an indication of pocket temperature. It has been discovered that the slider can adopt such a position, nearer the bowl end than the bearing end of the wire 22, that a linear scale can be used to indicate the rotor pocket temperature.

FIG. 4 illustrates a circuit which can be used for temperature indication and control. The temperature sensitive element 30 is connected into one arm of a double Wheatstone bridge 31. This bridge is in effect the combination of two bridges and thus has two output diagonals. One diagonal contains an electric meter 32 for giving the temperature indication with a linear scale. The other diagonal is connected to a transistor chopper circuit 33 which converts the direct current output of the bridge into an alternating current signal. This signal is fed to an alternating current amplifier 34 and thence to a control circuit 35 comprising rectifier means and a relay which is arranged to control the heating and refrigeration equipment 36.

It is to be seen that the slider is provided with the screw 29 in order that its position upon the wire 22 may be adjusted, by rotating ring 21, and fixed. This is of course necessary in the calibration of the centrifuge. Such calibration might be as follows having provided the meter 32 with an appropriate linear scale, e.g. one of 90° extent from −30° to +60° centigrade. A rotor, which contains test tubes filled which glycerine and distilled water, is firstly precooled to about 0° C. and then inserted into the centrifuge. The centrifuge is then run up to its operating speed at which it is maintained until stable conditions prevail, the time necessary for this normally amounting to about two hours. The centrifuge is then stopped, the temperature of the material in the pockets is ascertained by an accurate thermometer immediately and the slider adjusted in position on the wire by rotation of the ring 21 to give the corresponding temperature indication on the meter. A check can then be made by repeating the procedure until such time as the correct position of the slider has been found. The screw 29 is finally tightened.

An alternative method of calibration would be to commence with a clean dial for the meter 32, to fix from the start the position of the slider and carry out a series of tests at different temperatures to find the correct dial positions for respective temperatures, which positions will be marked on the dial. This procedure, however, does not necessarily result in a linear scale.

I claim:
1. In a centrifuge comprising a bowl which can be evacuated, a driving shaft extending into said bowl for supporting a rotor, a bearing rotatably supporting said shaft and a temperature sensitive element for obtaining a measure of the temperature of rotor contents:
the improvement which comprises an elongate member of good thermal conductivity coupled in thermally conductive manner at one region of said member to said bowl, at another region to said bearing and at a region intermediate said one region and said another region to said temperature sensitive element.
2. A centrifuge as claimed in claim 1 and wherein said elongate member is a wire which extends along an arcuate path about the axis of said shaft.
3. A centrifuge as claimed in claim 1, wherein said temperature sensing element is carried by a slider slidable on said elongate member.
4. A centrifuge as claimed in claim 3, and comprising an annular member coaxial with said shaft, carrying said slider and rotatable about the axis of said shaft.
5. A centrifuge as claimed in claim 4, wherein said bearing has a housing which defines an annular channel with said annular member and in which channel said elongate member extends along an arcuate path substantially coaxial with the axis of said shaft.
6. A centrifuge as claimed in claim 1, and comprising means shielding said elongate member from direct radiation from said rotor.
7. A centrifuge as claimed in claim 1, and comprising bowl temperature control means of which said temperature sensitive element forms an actual value source.

References Cited
UNITED STATES PATENTS

| | | | |
|---|---|---|---|
| 2,885,188 | 5/1959 | Pickels et al. | 73—351 |
| 3,246,688 | 4/1966 | Colburn | 73—351 |
| 3,317,125 | 5/1967 | Holden | 73—351 |
| 3,322,338 | 5/1967 | Stallman et al. | 73—351 |
| 3,347,453 | 10/1967 | Goergen | 73—351 |

S. CLEMENT SWISHER, Primary Examiner

D. E. CORR, Assistant Examiner

U.S. Cl. X.R.
73—362, 362.8